J. H. GOLLADAY.
CLOVER HULLING ATTACHMENT TO THRASHING MACHINES.

No. 108,347.  Patented Oct. 18, 1870.

Witnesses:

Inventor:

United States Patent Office.

JACOB H. GOLLADAY, OF NEW LISBON, OHIO, ASSIGNOR TO HIMSELF AND J. W. WHIDDEN, OF ROCKFORD, ILLINOIS.

Letters Patent No. 108,347, dated October 18, 1870.

IMPROVEMENT IN CLOVER-HULLING ATTACHMENTS TO THRASHING-MACHINES.

The Schedule referred to in these Letters Patent and making part of the same.

*To all whom it may concern:*

Be it known that I, JACOB H. GOLLADAY, of New Lisbon, in the county of Columbiana and State of Ohio, have invented a new and useful Improvement in Clover-hulling Attachments to Thrashing-Machines; and I do hereby declare that the following is a full, clear, and exact description thereof, which will enable others skilled in the art to make and use the same, reference being had to the accompanying drawing forming a part of this specification.

My invention relates to means for thrashing and hulling clover-seed, and my object is to combine with the ordinary grain-thrasher such instrumentalities as will enable it to accomplish that object effectively and cheaply.

I will first describe my improvements, in connection with all that is necessary to a full understanding thereof, and then point them out clearly in the claim.

Similar letters of reference indicate corresponding parts.

Figure 1:
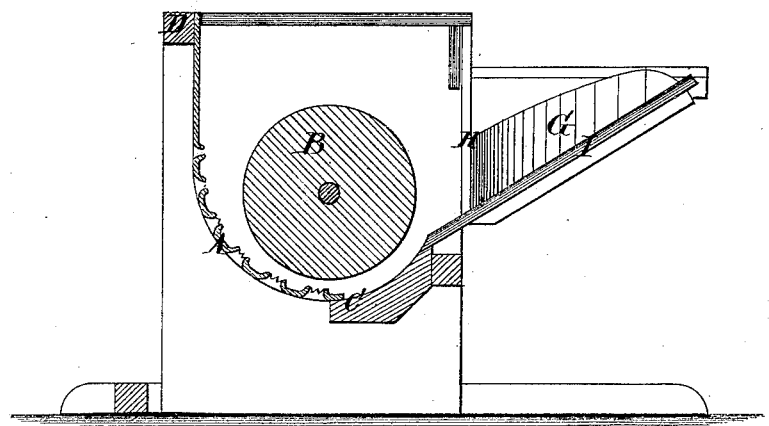
Figure 1 is a sectional elevation of a thrashing-cylinder and feed-board, with my improved attachments.
Figure 2:
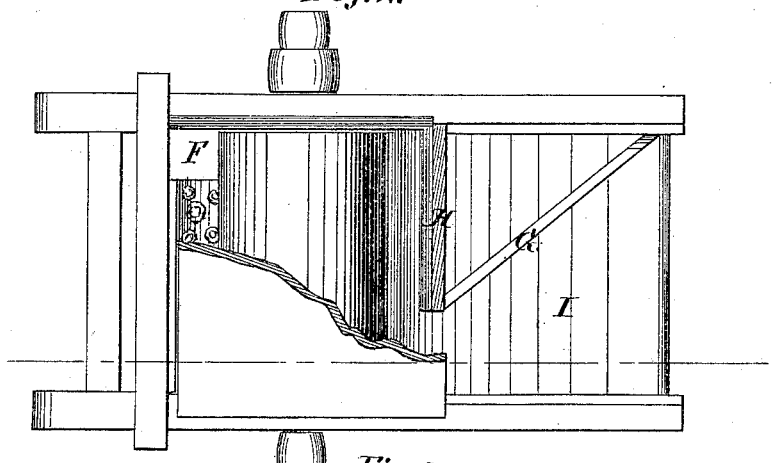
Figure 2 is a plan view, with a part broken away.
Figure 3:
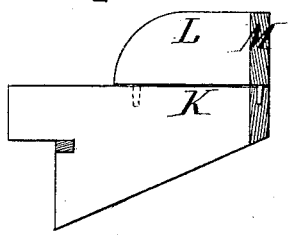
Figure 3 is a sectional view, showing my attachments to the shaking-shoe of the thrashing-machine.

A is a thin sheet-metal plate, not quite as wide as the length of the working-face of the cylinder B, and of a suitable length to rest one end on the lower edge of the concave attachment C, having the fixed teeth of the thrasher, and the other end against the cross-bar D of the cap, and to occupy the curved position shown in fig. 1.

The inner surface of this sheet is roughened by perforations from the outside, and it is so placed as to close the discharge-space in rear of the cylinder, except at the narrow space F at one end.

G and H are narrow boards, joined at one end, so as to form the sides of a right-angled triangle, and placed on the feed-board I, so that the chaff and seed fed to the machine will be carried to that end of the cylinder where the discharge-passage is closed by the perforated plate A. This causes the seed to be subjected to a continued scouring and hulling action between the cylinder and its teeth and the roughened plate A, until the seed is worked gradually along to the discharge-orifice F.

These attachments A and G H may be very readily applied to the thrasher, and convert it in a very simple manner into an efficient hulling-machine.

In order to prevent the clover-seed and chaff being blown from the top of the front and ends of the shoe K, used with the thrashing-machine in the first operation, I attach the top sides L and end M, and I propose to apply a canvas hood thereto, as a further means of preventing the escape of the seed.

These boards are detachably connected, so as to be readily taken off when the machine is used for thrashing grain.

Having thus described my invention,

What I claim as new, and desire to secure by Letters Patent, is—

1. The combination, with the cylinder of the ordinary thrashing-machine, of the concave perforated sheet-metal plate A, roughened on the inside, and covering all the discharge-space behind the cylinder, except at F, as and for the purpose described.

2. The combination, in a thrashing-machine, of the concave A, constructed as described, with the obliquely-transverse incline G, arranged as shown, and for the purpose specified.

JACOB H. GOLLADAY.

Witnesses:
JOHN GOLLADAY,
SAMUEL HARDMAN.